United States Patent
Winarski

(10) Patent No.: US 8,241,767 B2
(45) Date of Patent: *Aug. 14, 2012

(54) MAGNETIC DISK FORMED OF NANOTUBE ARRAYS CONTAINING MAGNETIC NANOPARTICLES

(75) Inventor: Tyson York Winarski, Mountain View, CA (US)

(73) Assignee: Sigma Pro Ltd. LLC, Dover, DE (US)

( * ) Notice: Subject to any disclaimer, the term of this patent is extended or adjusted under 35 U.S.C. 154(b) by 14 days.

This patent is subject to a terminal disclaimer.

(21) Appl. No.: 12/700,742

(22) Filed: Feb. 5, 2010

(65) Prior Publication Data

US 2010/0291412 A1    Nov. 18, 2010

Related U.S. Application Data

(62) Division of application No. 11/278,879, filed on Apr. 6, 2006, now Pat. No. 7,687,160.

(51) Int. Cl.
*G11B 5/65* (2006.01)
(52) U.S. Cl. .................. 428/845.1; 428/836.3; 977/742
(58) Field of Classification Search ............... 428/836.3, 428/835.3; 977/742
See application file for complete search history.

(56) References Cited

U.S. PATENT DOCUMENTS

| | | | |
|---|---|---|---|
| 4,333,985 A | 6/1982 | Shirahata | |
| 6,465,132 B1 | 10/2002 | Jin | |
| 6,835,330 B2 | 12/2004 | Nishino | |
| 6,962,685 B2 | 11/2005 | Sun | |
| 7,045,088 B2 | 5/2006 | Matsumiya | |
| 7,687,160 B2* | 3/2010 | Winarski | 428/836.3 |
| 7,803,262 B2 | 9/2010 | Haik | |
| 2003/0190278 A1 | 10/2003 | Wang | |
| 2004/0071951 A1 | 4/2004 | Jin | |
| 2005/0058805 A1 | 3/2005 | Kimura | |
| 2005/0142385 A1 | 6/2005 | Jin | |
| 2005/0170169 A1 | 8/2005 | Watanabe et al. | |

(Continued)

FOREIGN PATENT DOCUMENTS

JP    2005056534    3/2005

(Continued)

OTHER PUBLICATIONS

Tyagi et al. "Preparation of Ni-filled carbon nanotubes for key potential applications in nanotechnology." (2204) Thin Solid Films 469-470: 127-130.*

*Primary Examiner* — Holly Rickman
*Assistant Examiner* — Linda Chau
(74) *Attorney, Agent, or Firm* — Christensen O'Connor Johnson Kindness PLLC

(57) ABSTRACT

A magnetic storage medium is formed of magnetic nanoparticles that are encapsulated within nanotubes (e.g., carbon nanotubes), which are arranged in a substrate to facilitate the reading and writing of information by a read/write head. The substrate may be flexible or rigid. Information is stored on the magnetic nanoparticles via the read/write head of a storage device. These magnetic nanoparticles are arranged into data tracks to store information through encapsulation within the carbon nanotubes. As carbon nanotubes are bendable, the carbon nanotubes may be arranged on flexible or rigid substrates, such as a polymer tape or disk for flexible media, or a glass substrate for rigid disk. A polymer may assist holding the nano-particle filled carbon-tubes to the substrate.

20 Claims, 5 Drawing Sheets

Nanotube with encapsulated magnetic nanoparticles

U.S. PATENT DOCUMENTS

| | | |
|---|---|---|
| 2006/0075418 A1 | 4/2006 | Kurt |
| 2006/0099461 A1 | 5/2006 | Jones |
| 2007/0158610 A1 | 7/2007 | Hong |
| 2007/0184969 A1 | 8/2007 | Dubois et al. |
| 2007/0290384 A1 | 12/2007 | Kodas et al. |
| 2008/0224100 A1* | 9/2008 | Smalley et al. ............ 252/510 |
| 2009/0053512 A1 | 2/2009 | Pyun et al. |
| 2009/0202644 A1 | 8/2009 | Gogotsi et al. |
| 2009/0220561 A1 | 9/2009 | Jin |

FOREIGN PATENT DOCUMENTS

JP 2005056534 A * 3/2005

* cited by examiner

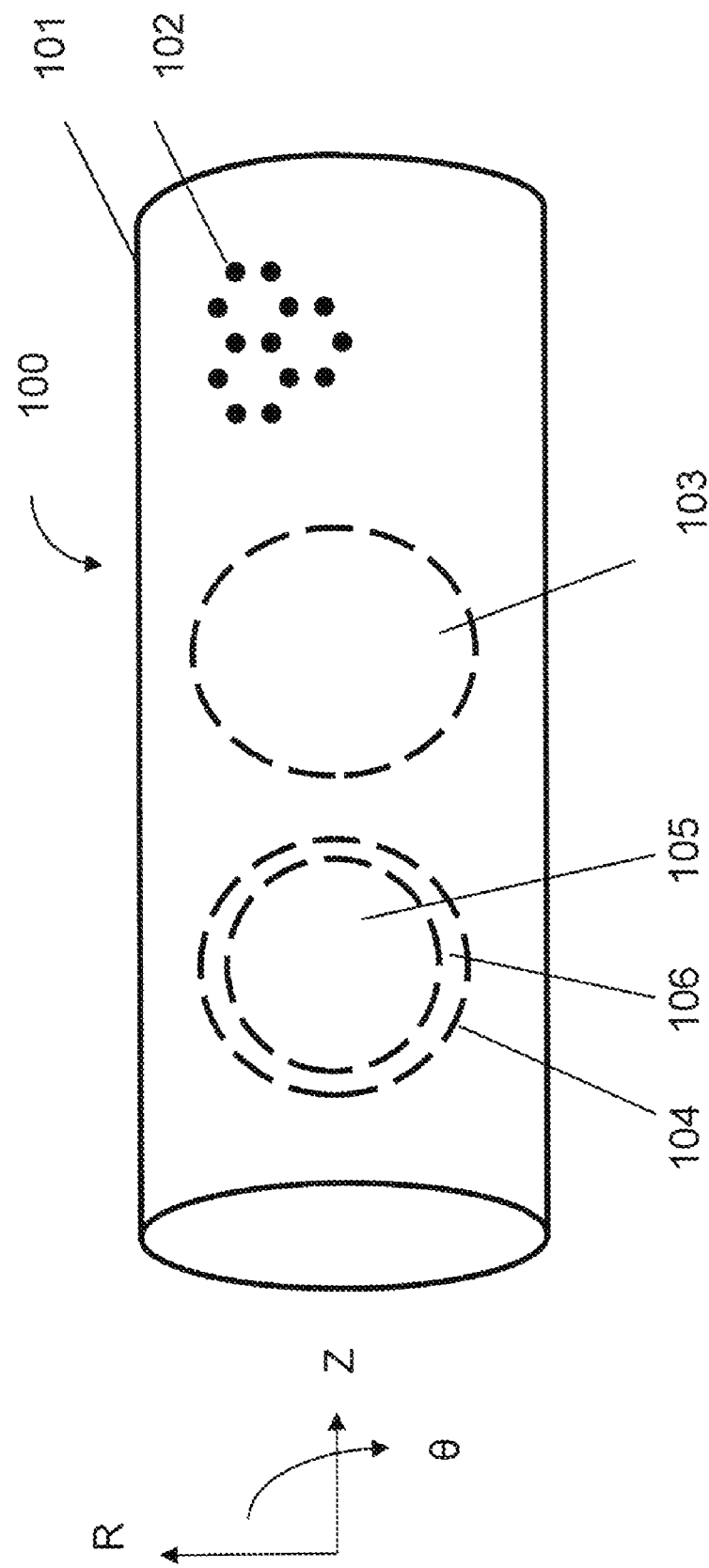
FIG. 1 – Nanotube with encapsulated magnetic nanoparticles

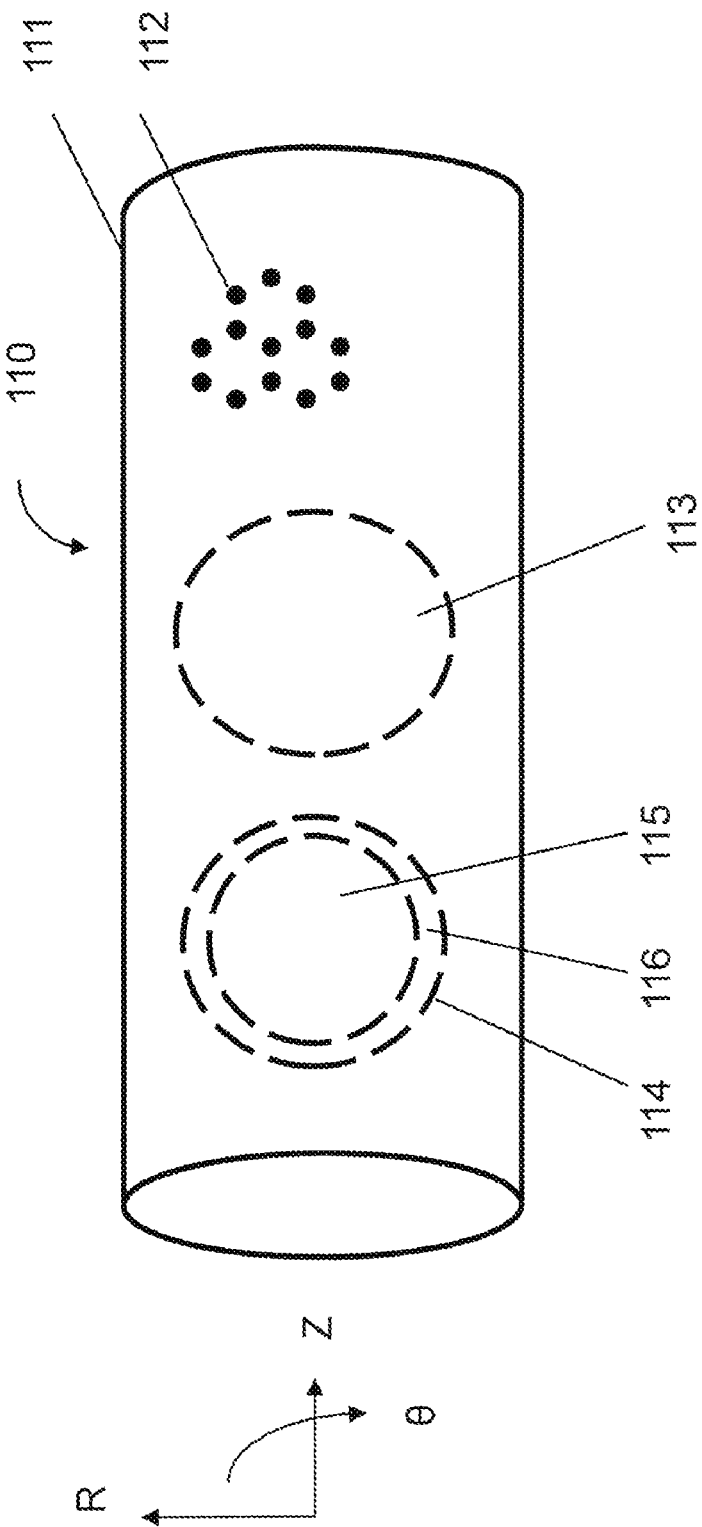
FIG. 2 – Nanotube with encapsulated magnetic-shunt nanoparticles

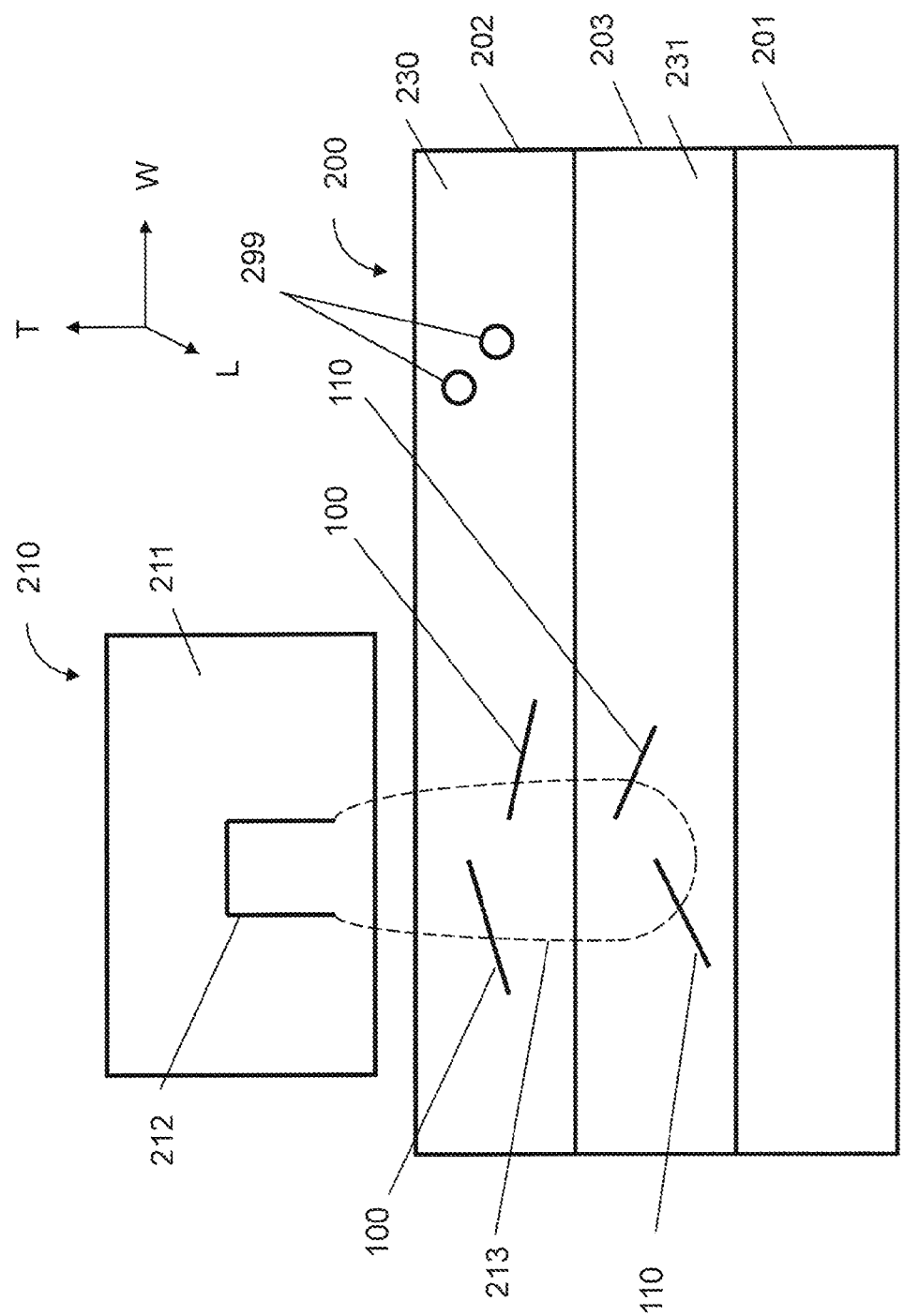
FIG. 3 – Cross-section of Magnetic Medium

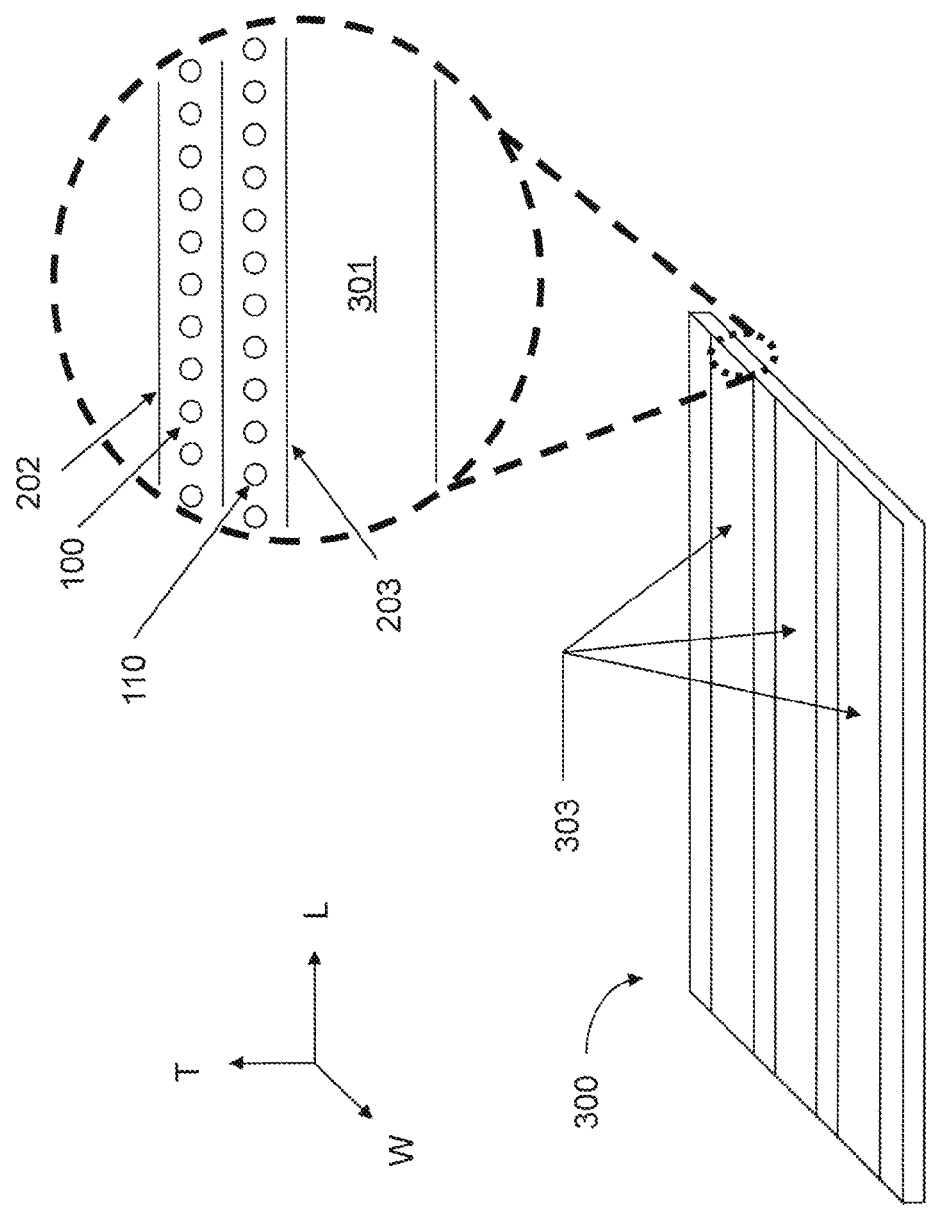
FIG. 4 View of Magnetic Tape

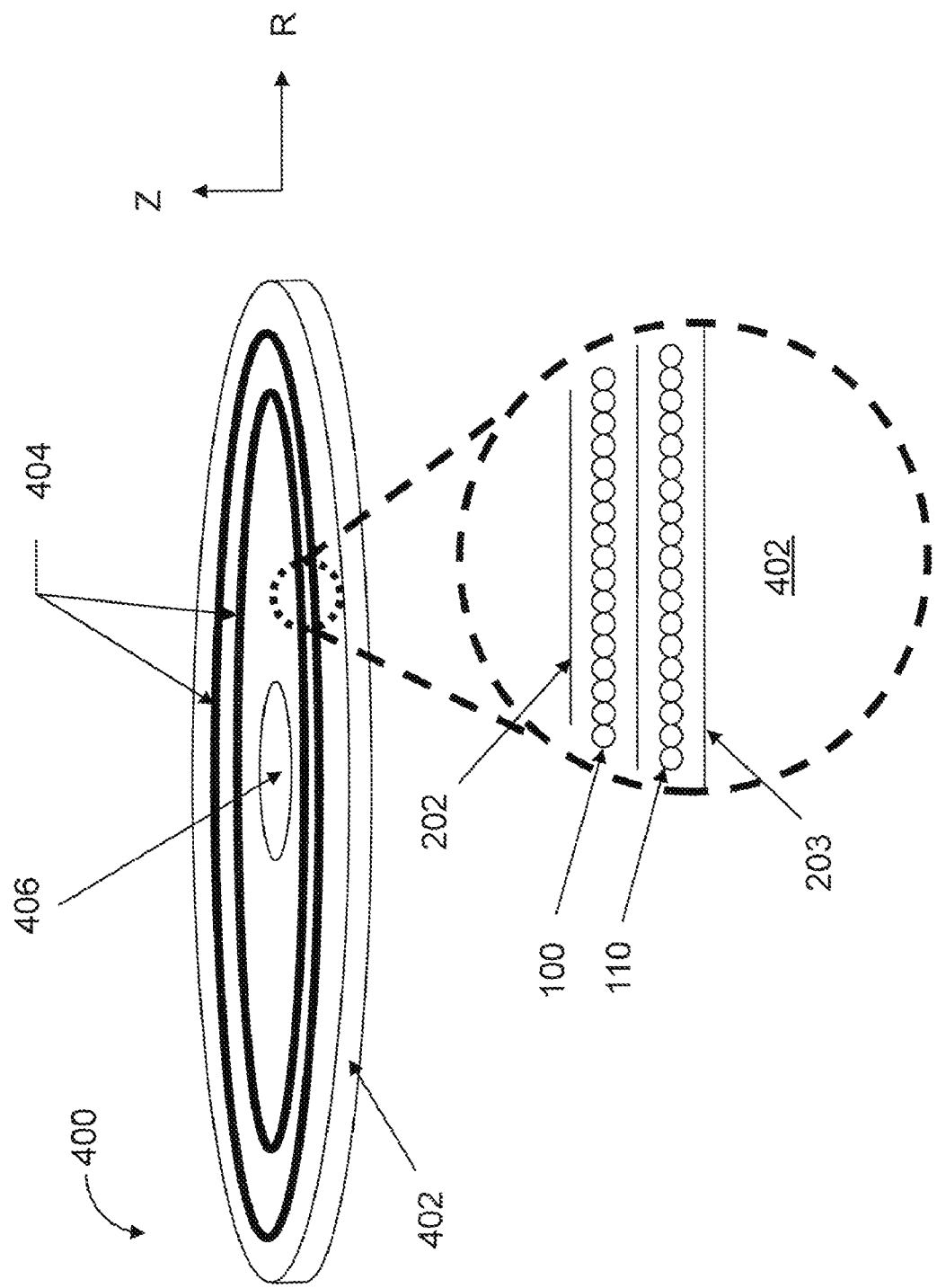
FIG. 5 – View of Disk with Concentric Rings

MAGNETIC DISK FORMED OF NANOTUBE ARRAYS CONTAINING MAGNETIC NANOPARTICLES

This application is a Divisional of U.S. patent application Ser. No. 11/278,879, entitled MAGNETIC STORAGE MEDIUM FORMED OF CARBON NANOTUBE ARRAYS filed on Apr. 6, 2006, issued as U.S. Pat. No. 7,687,160, which is hereby incorporated by reference in its entirety.

BACKGROUND

The pursuit of higher performance computing systems is driving the reduction in scale of magnetic storage media. Higher storage densities allow for the reduction of device sizes, an enhancement of device capabilities, and a reduction in data storage costs. To facilitate this increase in magnetic data storage density, industry is constantly searching for structures and processes to reduce the size of information storage sectors and tracks on magnetic tape and magnetic disks.

Current magnetic media technology is based upon the ability to polarize cells of magnetic materials that are deposited directly on a substrate material. These substrate materials are flexible, in the case of magnetic tape of floppy disks, or rigid, in the case of hard disks. Physics places an eventual limit on the ability to increase the storage density of media that is formed of magnetic particles deposited directly on such a storage tape or disk. In the near future, the magnetic storage media industry will reach this storage density limit. It is therefore essential to find new technologies to replace direct deposition of magnetic materials to facilitate further increases in magnetic storage media density.

SUMMARY

The present invention is a magnetic storage medium formed of magnetic nanoparticles that are encapsulated within carbon nanotubes, which are arranged on a substrate to facilitate the reading and writing of information by a read/write head. The substrate may be flexible or rigid. Information is stored on the magnetic nanoparticles via the read/write head of a storage device. These magnetic nanoparticles are arranged into data tracks to store information through encapsulation within the carbon nanotubes. As carbon nanotubes are bendable, the carbon nanotubes may be arranged on flexible or rigid substrates, such as a polymer tape or disk for flexible media, or a glass substrate for rigid disk. A polymer matrix may assist holding the nano-particle filled carbontubes to the substrate.

The use of magnetic nanoparticles to store information facilitates a vast increase in the storage density capability of magnetic storage media. Encapsulation of these magnetic nanoparticles within carbon nanotubes allows for the organization of the magnetic nanoparticles into tracks and sectors of information storage media that a read/write head of a storage device can store information.

BRIEF DESCRIPTION OF THE DRAWINGS

FIG. 1 depicts an isometric view of magnetic nanoparticles encapsulated within a carbon nanotube.

FIG. 2 depicts an isometric view of shunt nanoparticles encapsulated within a shunt carbon nanotube.

FIG. 3 depicts a cross section of a nano-scale magnetic medium having magnetic and shunt nanoparticles encapsulated within respective carbon nanotubes that are on a substrate.

FIG. 4 depicts a view of an arrangement of carbon nanotube data storage tracks on a magnetic tape.

FIG. 5 depicts a view of an arrangement of carbon nanotube data storage tracks on a disk.

DETAILED DESCRIPTION

FIG. 1 shows magnetic carbon nanotube assembly 100 comprising carbon nanotube 101. Carbon nanotube 101 is illustrated as a single-wall hollow tube formed of a single layer of carbon atoms in either hexagonal lattice pattern 102 or 112 (FIG. 2). Since carbon nanotube 101 is hollow, it can contain nanoparticles 103 and 104. Carbon nanoparticle 103 has a high magnetic coercivity so that it can permanently retain a first magnetic field until that field is changed to a second magnetic field. Also, nanoparticle 103 is a particle which does not oxidize or rust on ambient air, such as CrO.sub.2 (chromium dioxide). Such oxidation would cause the loss of the stored magnetic field. Nanoparticle 104 also has a high magnetic coercivity, so that it can permanently retain a first magnetic field until that field is changed to a second magnetic field. Nanoparticle 104 contains high coercivity core 105 which holds the permanent magnetic field. To prevent oxidation, core 105 is encapsulated in shell 106. An example of core 105 is pure Fe (iron) and shell 106 is iron oxide, such as Fe.sub.2O.sub.3.

FIG. 2 shows shunt carbon nanotube assembly 110 comprising carbon nanotube 111. Like carbon nanotube 101, carbon nanotube 111 is illustrated as a single-wall hollow tube preferably formed of a single layer of carbon atoms in either hexagonal lattice pattern 112 or 102 (FIG. 1). Hexagonal lattice 112 is rotated ninety degrees from hexagonal lattice 102 and suitable nanotubes comprising either lattice can be used. Since carbon nanotube 111 is hollow, it can contain nanoparticles 113 and 114. Carbon nanoparticle 113 has a low or zero magnetic coercivity so that it does not permanently retain a first magnetic field, which allows nanoparticle 113 to act as a magnetic shunt. Also, nanoparticle 113 is a particle which does not oxide or rust in ambient air, such as a soft-ferrite. Nanoparticle 114 also has low or zero coercivity, so that it does not permanently retain a first magnetic field. Nanoparticle 114 contains low or zero coercivity core 115 which provides the desired magnetic shunt. To prevent oxidation, core 115 is encapsulated in shell 116. An exemplary material for nanoparticle 114 is a soft-ferrite. Soft-ferrites, like other shunt materials, duct magnetic flux without retaining any "after field."

FIGS. 1-2 shows Z axis along the length of nanotubes 101 and 111. Nanotubes 101 and 111 can either be Single-Walled carbon NanoTubes (SWNT) or Multi-Walled carbon NanoTubes (MWNT). MWNT's may be formed with 2, 3, or more layers. The diameter D of nanotubes 101 and 111 is measured in nanometers. The diameter of the nanotubes, up to 12 nm, limits the size of nanoparticles 103-104 and 113-114. In addition to those materials already mentioned, exemplary materials for magnetic nanoparticles 103-104 or 113-114 include Cobalt (Co), Cobalt (Co) and their alloys, Cobalt-ferrite, Cobalt-nitride, Cobalt-oxide (Co—O), Cobalt-palladium (Co—Pd), Cobalt-platinum (Co—Pt), Iron (Fe), Iron (Fe) and their alloys, Iron-Gold (Fe—Au), Iron-Chromium (Fe—Cr), Iron-nitride (Fe—N), Iron-oxide (Fe$_3$O$_4$), Iron-palladium (Fe—Pd), Iron-platinum (Fe—Pt), Fe—Zr—Nb—B, Mn-nitride (Mn—N), Nd—Fe—B, Nd—Fe—B—Nb—Cu, Nickel (Ni), Nickel (Ni) and their alloys, and soft-ferrite. These magnetic nanoparticles can be manufactured with sizes of 10 nm or less, such that these nanoparticles can fit within nanotubes 101 and 111. Examples of soft-ferrites include Mn—Zn, single crystal Mn—Zn, and Ni—Zn.

FIG. 3 shows magnetic storage medium 200. The T axis is along the thickness direction of magnetic storage medium 200. If magnetic medium 200 is magnetic tape, then the L axis is along the length of the tape and the W axis is along the width of the tape. Magnetic storage medium 200 comprises substrate 201, data recording layer 202, and optional shunt layer 203 in between substrate 210 and data recording layer 202. For magnetic tape and floppy disks, substrate 210 is typically polytetrafluoroethelyne (PTFE), which is commonly known by the trade name MYLAR™. For hard disks, substrate 201 can be aluminum, glass, or a stiff plastic, such as polycarbonate Data recording layer 202 comprises a plurality magnetic carbon nanotube assemblies 100 which are embedded in a polymer matrix, such as HDPE 230 (High Density Poly Ethylene). Alternately, nanotube assemblies 100 are first encapsulated in HDPE and then embedded in a second polymeric matrix. Nanotubes 100 provide a home for nanoparticles 103-104, so they do not clump into large masses within the data recording layer.

Shunt layer 203 comprises a plurality magnetic carbon nanotube assemblies 110 which are embedded in a matrix comprising HDPE 231. Alternately, nanotube assemblies 110 are first encapsulated in HDPE and then embedded in a second polymeric matrix. Nanotubes 110 provide a home for the shunt nanoparticles 113-114, so they do not clump into large masses within the shunt layer. Use of shunt layer 203 is optional, but it yields improved data recording when included in magnetic storage medium 200.

Magnetic recording head 210 comprises write element 212 mounted on a soft ferrite matrix 211. Write element 212 is essentially a U-shaped piece of low coercivity material and a wire coil, which forms an electro-magnet. That portion of write element 212 adjacent to magnetic storage medium 200 is open, to allow magnetic flux 213 to leave recording head 210 and penetrate magnetic storage medium 200 and imprint data in the form of 1's and 0's based on the magnetic polarity of flux 213. Shunt layer 203 completes the magnetic circuit (analogous to completing an electrical circuit) and keeps flux 213 from "fringing" excessively. Shunt layer 203 permits more crisp edge transitions, thus permitting higher data densities on magnetic storage medium 200. Thus, data is stored in layer 202 with the assistance of shunt layer 203. Similarly, shunt layer 203 can assist in the reading of data. Write element 212 may further comprise a Metal-In-Gap (MIG) write head.

Data is read from magnetic storage medium 200, by means of a non-limiting example, via a magnetoresistive head, or a spin-valve head which is alternately knows as a giant magnetoresistive "GMR" head.

The process for forming magnetic storage medium 200 is to first apply shunt layer 203 onto substrate 201. This may be done as a thin monolayer of nanotubes by running magnetic tape through a solution of HDPE 231 containing nanotubes 110. This may also be done as a thin monolayer of nanotubes 100 by spin coating a solution of HDPE 231 containing nanotubes 100 onto a magnetic disk. Multiple shunt monolayers can be layered on top of the first monolayer forming shunt layer 203 through repeating this process. To maximize dispersal of nanotubes 100 and 110, ethylene or another material that disperses carbon nanotubes may be used.

Once shunt layer 203 is cured, which may include supplemental heating or compression by rollers, data recording layer 202 is then added. This may be done as a thin monolayer of nanotubes by running magnetic tape through a solution of HDPE 230 containing nanotubes 100, and then curing the data layer 202. This may also be done as a thin monolayer of nanotubes 100 by spin coating a solution of HDPE 230 containing nanotubes 100 onto a disk, and then curing the data layer. Multiple data recording monolayers can be layered on top of the first monolayer forming data layer 202 through repeating this process. To maximize dispersal of nanotubes 100 and 110, ethylene another material that disperses carbon nanotubes may be used. Nanotubes 100 and 110 may be coated with an initial shell of HDPE before being added to HDPE 230 and 231.

FIG. 4 shows magnetic tape media 300 comprising substrate 301, magnetic data-recording layer 202, and shunt layer 203. The L axis is along the length of tape 300, the W axis is along the width of the tape, and the T axis is along the thickness of the tape. Tape media 300 has substrate 301 typically formed of polytetrafluoroethelyne (PTFE), which is commonly known by the trade name MYLAR™. Shunt layer 203 is formed on substrate 301. Shunt layer 203 is formed of a monolayer of shunt carbon nanotube assemblies 110. Assemblies 110 include carbon nanotubes 111 containing nanoparticles 113 and 114. Carbon nanoparticle 113 has a low or zero magnetic coercivity so that it does not permanently retain a first magnetic field, which allows nanoparticles 103 to act as a magnetic shunt. Data recording layer 202 is formed of a monolayer of carbon nanotube assemblies 100. Assemblies 100 include carbon nanotubes 101 which contain nanoparticles 103 and 104. Carbon nanoparticle 103 has a high magnetic coercivity so that it can permanently retain a first magnetic field until that field is changed to a second magnetic field, allowing for data storage. Carbon nanotubes 101 and 111 are oriented such that they are generally parallel to the length wise direction tape media 300. Data tracks 303 are shown, from magnetic flux transitions recorded by magnetic head 210 in magnetic data-recording layer 202.

FIG. 5 shows magnetic disk 400 with monolayer rings 404 of layer 202 and 203 formed in layers about the center of disk 400. These layers may be further masked into individual rings 404. Rings 404 may be formed as distinct rings on disk 400 to form independent tracks. If disk 400 is a hard disk, substrate 403 can be aluminum, glass, or a stiff plastic, such as polycarbonate. If disk 400 is a floppy disk, substrate 402 is typically polytetrafluoroethelyne (PTFE), which is commonly known by the trade name MYLAR™. Z is the direction perpendicular to the disk and the R axis is the radial direction. Shunt layer 203 is formed of a monolayer of shunt carbon nanotube assemblies 110. Assemblies 110 include carbon nanotubes 111 containing nanoparticles 113 and 114. Carbon nanoparticle 113 has a low or zero magnetic coercivity so that it does not permanently retain a first magnetic field, which allows nanoparticle 113 to act as a magnetic shunt. Data recording layer 202 is formed of a monolayer of carbon nanotube assemblies 100. Assemblies 100 include carbon nanotubes 101 which contain nanoparticles 103 and 104. Carbon nanoparticle 103 has a high magnetic coercivity so that it can permanently retain a first magnetic field until that field is changed that field is changed to a second magnetic field, allowing for data storage. Carbon nanotubes 101 and 111 may be oriented such that they extend radially from the center of disk 400. Alternatively, carbon nanotubes 101 and 111 may be oriented such that they extend in a spiral pattern from the center of the disk 400.

One method of forming rings 404 is through a photo-etching process. Layers 202 and 203 are first deposited onto disk 400 preferably through a spin coating process. A layer of photoresist material is then deposited on top of layers 202 and 203. This layer of photoresist is exposed through a mask, thereby patterning layers 202 and 203. A removal process leaves the patterned layers 202 and 203. While shown as rings 404, layers 202 and 203 may be patterned into any desirable track or sector pattern for data storage. Alternatively, when disk 400 is made of polycarbonate, rings 404 could be formed through a molding process. Recording layer 202 may further comprise buckyballs 299, which would act to reduce friction between the recording layer 202 and the magnetic head 210.

While the invention has been shown and described with reference to a particular embodiment thereof, it will be understood to those skilled in the art, that various changes in form and details may be made therein without departing from the spirit and scope of the invention.

The invention claimed is:

1. A magnetic disk, comprising:
   a substrate; and
   a layer of magnetic media on said substrate, said magnetic media comprising:
      a plurality of magnetic nanoparticles contained within a carbon nanotube; and
      a plurality of said carbon nanotubes encapsulated in a matrix.

2. The magnetic disk of claim 1, said layer further comprising a shunt layer, said shunt layer comprising:
   a plurality of low coercivity magnetic nanoparticles contained within a carbon nanotube; and
   a plurality of said carbon nanotubes encapsulated in a matrix.

3. The magnetic disk of claim 1, said layer further comprising a plurality of bucky balls that reduce friction between said layer and a read/write head.

4. The magnetic disk of claim 1, wherein said plurality of magnetic nanoparticles are selected from the group consisting of Cobalt (Co), Cobalt-nitride, Cobalt-oxide (Co—O), Cobalt-palladium (Co—Pd), Cobalt-platinum (Co—Pt), Iron (Fe), Iron-Gold (Fe—Au), Iron-Chromium (Fe—Cr), Iron-Nitride (Fe—N), Iron-oxide ($Fe_3O_4$), Iron-palladium (Fe—Pd), Fe—Zr—Nb—B, Mn-nitride (Mn—N), Nb—Fe—B, Nd—Fe—B—Nb—Cu, and Nickel (Ni).

5. The magnetic disk of claim 2, wherein said plurality of low coercivity magnetic nanoparticles are selected from the group consisting of Mn—Zn, single crystal Mn—Zn, and Ni—Zn.

6. The magnetic disk of claim 1, wherein said layer comprises a mono-layer of said carbon nanotubes.

7. The magnetic disk of claim 1, wherein said carbon nanotubes are arranged into a data track.

8. The magnetic disk of claim 1, wherein said matrix is comprised of High Density Poly Ethylene.

9. The magnetic disk of claim 1, wherein said substrate is flexible.

10. The magnetic disk of claim 2, wherein said plurality of low coercivity magnetic nanoparticles have low or near zero coercivity.

11. A magnetic disk, comprising:
    a layer of magnetic media, comprising:
       a plurality of magnetic nanoparticles contained within a carbon nanotube; and
       a plurality of said carbon nanotubes encapsulated in a matrix.

12. The magnetic disk of claim 11, said media further comprising a shunt layer, said shunt layer comprising:
    a plurality of low coercivity magnetic nanoparticles contained within a carbon nanotube; and
    a plurality of said carbon nanotubes encapsulated in a matrix.

13. The magnetic disk of claim 11, said media further comprising a plurality of bucky balls that reduce friction between said layer and a read/write head.

14. The magnetic disk of claim 11, wherein said plurality of magnetic nanoparticles are selected from the group consisting of Cobalt (Co), Cobalt-nitride, Cobalt-oxide (Co—O), Cobalt-palladium (Co—Pd), Cobalt-platinum (Co—Pt), Iron (Fe), Iron-Gold (Fe—Au), Iron-Chromium (Fe—Cr), Iron-Nitride (Fe—N), Iron-oxide ($Fe_3O_4$), Iron-palladium (Fe—Pd), Fe—Zr—Nb—B, Mn-nitride (Mn—N), Nb—Fe—B, Nd—Fe—B—Nb—Cu, and Nickel (Ni).

15. The magnetic disk of claim 12, wherein said plurality of low coercivity magnetic nanoparticles are selected from the group consisting of Mn—Zn, single crystal Mn—Zn, and Ni—Zn.

16. The magnetic disk of claim 11, wherein said layer comprises a mono-layer of said carbon nanotubes.

17. The magnetic disk of claim 11, wherein said carbon nanotubes are arranged into a data track.

18. The magnetic disk of claim 11, wherein said matrix is comprised of High Density Poly Ethylene.

19. The magnetic disk of claim 11, further comprising a flexible substrate.

20. A magnetic disk, comprising:
    a plurality of magnetic nanoparticles contained within a carbon nanotube; and
    a plurality of said carbon nanotubes encapsulated in a matrix.

* * * * *

UNITED STATES PATENT AND TRADEMARK OFFICE
CERTIFICATE OF CORRECTION

PATENT NO.         : 8,241,767 B2
APPLICATION NO.    : 12/700742
DATED              : August 14, 2012
INVENTOR(S)        : Winarski Page 1 of 1

It is certified that error appears in the above-identified patent and that said Letters Patent is hereby corrected as shown below:

On the Title Page, in Item (56), under "FOREIGN PATENT DOCUMENTS", in Column 2, Line 1, delete "JP 2005056534 3/2005".

On the Title Page, in Item (56), under "OTHER PUBLICATIONS", in Column 2, Line 2, delete "(2204)" and insert -- (2004) --, therefor.

In the Specification:

In Column 2, Lines 18-19, delete "CrO-.sub.2" and insert -- $CrO_2$ --, therefor.

In Column 2, Line 27, delete "Fe.sub.2O.sub.3." and insert -- $Fe_2O_3$. --, therefor.

In Column 3, Line 11, delete "polytetrafluoroethelyne" and insert -- polytetrafluoroethylene --, therefor.

In Column 3, Line 14, delete "polycarbonate" and insert -- polycarbonate. --, therefor.

In Column 4, Line 17, delete "polytetrafluoroethelyne" and insert -- polytetrafluoroethylene --, therefor.

In Column 4, Line 43, delete "polytetrafluoroethelyne" and insert -- polytetrafluoroethylene --, therefor.

In the Claims:

In Column 5, Line 35, in Claim 4, delete "(Co—0)," and insert -- (Co—O), --, therefor.

Signed and Sealed this
Thirteenth Day of August, 2013

Teresa Stanek Rea
*Acting Director of the United States Patent and Trademark Office*